(12) United States Patent
Galkowski et al.

(10) Patent No.: US 7,496,436 B2
(45) Date of Patent: Feb. 24, 2009

(54) METHOD AND DEVICE FOR ASSISTING AN OPERATOR OF A VEHICLE IN THE VEHICLE STABILIZATION

(75) Inventors: Fred Galkowski, Udenheim (DE); Thomas Berthold, Darmstadt (DE); Thomas Raste, Oberursel (DE); Urs Bauer, Ludwigsburg (DE)

(73) Assignee: Continental Teves AG & CVo. oHG, Frankfurt (DE)

( * ) Notice: Subject to any disclaimer, the term of this patent is extended or adjusted under 35 U.S.C. 154(b) by 0 days.

(21) Appl. No.: 10/581,016

(22) PCT Filed: Dec. 3, 2004

(86) PCT No.: PCT/EP2004/053270

§ 371 (c)(1),
(2), (4) Date: Mar. 16, 2007

(87) PCT Pub. No.: WO2005/054039

PCT Pub. Date: Jun. 16, 2005

(65) Prior Publication Data

US 2007/0239333 A1    Oct. 11, 2007

(30) Foreign Application Priority Data

Dec. 4, 2003   (DE) .................... 103 57 045

(51) Int. Cl.
*A01B 69/00* (2006.01)

(52) U.S. Cl. .......................... 701/41; 701/42

(58) Field of Classification Search ............... 701/41, 701/42; 180/443, 446
See application file for complete search history.

(56) References Cited

U.S. PATENT DOCUMENTS 6,256,561 B1    7/2001   Asanuma
6,640,923 B1 *  11/2003  Dominke et al. ........... 180/446

FOREIGN PATENT DOCUMENTS

| DE | 19527334 | 2/1996 |
|---|---|---|
| DE | 10032340 | 1/2002 |
| WO | 02/062647 | 8/2002 |

* cited by examiner

*Primary Examiner*—Richard M. Camby

(57) ABSTRACT

In a method and a device for assisting an operator of a vehicle in the vehicle stabilization, an additional steering torque is applied to the steering line of the vehicle.

The method manifests itself by the feature that a first component of the additional steering torque is determined depending on a steering angle difference between an instantaneous steering angle at steerable wheels of the vehicle and a nominal steering angle, and the steering angle difference is determined depending on a difference between an instantaneous value of a yaw rate of the vehicle and a value of a reference yaw rate, and with the value of the reference yaw rate being established in a vehicle model by way of a value of at least one variable predefined by the driver.

The device implements the method.

9 Claims, 17 Drawing Sheets

METHOD AND DEVICE FOR ASSISTING AN OPERATOR OF A VEHICLE IN THE VEHICLE STABILIZATION

BACKGROUND OF THE INVENTION

The present invention relates to a method for assisting an operator of a vehicle in the vehicle stabilization, wherein an additional steering torque is applied to the steering line of the vehicle.

Further, the invention relates to a device for assisting an operator of a vehicle, comprising a means for applying an additional steering torque to a steering line of a vehicle.

A large number of modern vehicles are already equipped with yaw rate control (ESP) which stabilizes a vehicle in critical driving situations. This control is based on wheel-individual brake interventions and interventions into engine control being performed when the vehicle behavior differs from a predetermined desired behavior. The control interventions are distinctly noticeable to the operator of the vehicle and, hence, very uncomfortable so that they are usually carried out only after a major deviation from the desired behavior has been identified.

It is also known in the art to set a steering angle stabilizing the driving condition of the vehicle in critical driving situations by way of control interventions into the steering system of the vehicle irrespective of the steering instructions of the operator. These interventions are not felt by the driver as a major impairment and can thus be performed already when insignificant deviations from the desired behavior occur. However, to this end, the vehicle must be equipped with an appropriate steering system, for example, an overriding steering system or a steer-by-wire steering system. Also, there is the risk of faulty control interventions which may considerably jeopardize the stability of the vehicle.

In view of the above, it is desirable to merely assist the driver of the vehicle at the start of an unstable driving behavior and, in particular, in his course holding task, without directly adjusting correcting variables such as the steering angle of the vehicle.

International patent application WO 02/062647 A1 describes a steering system for a vehicle where the operator of a vehicle receives haptic information about the driving condition. Depending on a difference between the yaw rate of the vehicle and a reference yaw rate, an electric motor is used to adjust a steering torque which renders the steering system easily movable or more difficult to move.

However, this arrangement does not provide the driver with specific instructions how to stabilize the vehicle in the presence of an unstable driving condition. In particular inexperienced drivers do not know, e.g. in an understeering or oversteering situation, however, in which way they have to react in order to reach a stable driving condition.

In view of the above, an object of the invention involves improving a method of the type mentioned hereinabove to such extent that the driver of a vehicle is reliably assisted in stabilizing the vehicle.

SUMMARY OF THE INVENTION

The invention provides a method of assisting an operator of a vehicle in the vehicle stabilization wherein an additional steering torque is applied to a steering line of the vehicle, which is characterized in that a first component of the additional steering torque is determined depending on a steering angle difference between an instantaneous steering angle at steerable wheels of the vehicle and a nominal steering angle, and the steering angle difference is determined depending on a difference between an instantaneous value of a yaw rate of the vehicle and a value of a reference yaw rate, and with the value of the reference yaw rate being established in a vehicle model by way of a value of at least one variable predefined by the driver.

The driver can be assisted reliably and efficiently by a method of this type in adjusting a nominal steering angle which stabilizes the driving condition of the vehicle, e.g. in an oversteering situation.

In this arrangement, the reference yaw rate is established preferably depending on a steering angle set by the operator of a vehicle and thus takes into account the driving behavior of the vehicle desired by the driver.

However, it has shown then that the application of the additional steering torque can cause instabilities, especially in vehicles which are equipped with an ESP controller for controlling a yaw rate deviation. This could be deduced from the fact that the reference yaw rate is influenced by the steering movements of the driver when assisted by the additional steering torque. The reciprocal influencing of the value of the additional steering torque and the value of the reference yaw rate partly resulted in oscillations in the yaw rate, causing the vehicle to 'build up'.

To overcome this problem, it is arranged for in a favorable embodiment of the invention that the additional steering torque is discontinued when the absolute value of the instantaneous yaw rate of the vehicle irrespective of the sign drops below a value of the reference yaw rate which is established at the time of start of an unstable driving situation.

A stable control of the driving condition of the vehicle could be achieved thereby.

In another favorable embodiment of the invention, the steering angle deviation is determined depending on a difference between an instantaneous value of the yaw rate of the vehicle and the value of the reference yaw rate which is established at the time of start of an unstable driving situation.

This condition also allows avoiding reciprocal influencing of the value of the additional steering torque and the value of the reference yaw rate, and achieving a stable control.

The point of time of the start of an unstable driving situation is preferably determined by activation logic. Suitably, the activation logic has access to results of a driving situation detection unit.

In another favorable embodiment of the invention, it is provided that a second component of the additional steering torque is determined depending on an estimated value of a tire resetting moment.

It is then rendered possible by considering the tire resetting moment to take into account the instantaneous road condition in the control interventions. In particular a different tire resetting moment is achieved for different coefficients of friction of the roadway so that the value of the additional steering torque can be adapted to them.

The tire resetting moment is preferably estimated by a disturbance observer unit.

In another favorable embodiment of the invention, the additional steering torque is established by addition of the first and the second component.

This fact permits determining the control component of the additional steering torque, which is derived from the steering angle deviation, and the component that is established from the tire resetting moment and can be considered as disturbance component irrespective of each other, so that a steering angle controller employed can be designed in a very simple and reliable fashion.

In another preferred embodiment of the invention, it is provided that the amount of the additional steering torque is limited.

Control interventions are thereby prevented in which the additional steering torque becomes so high that the driver can lose control of the steering system of the vehicle.

In addition, the invention provides a favorable device for implementing the method of the invention.

The device for assisting an operator of a vehicle in stabilizing a vehicle, comprising a means for adjusting an additional steering torque by way of an additional steering torque signal, manifests itself by the feature that a means for determining a reference yaw rate transmits a reference yaw rate signal to a steering angle controller which determines a first additional steering torque signal depending on a difference between the reference yaw rate signal and a measured yaw rate signal.

Further advantageous embodiments of the device make it possible to determine a control intervention, as has been described hereinabove, depending on a comparison between the instantaneous yaw rate of the vehicle and a value of the reference yaw rate which is established at a time of start of an unstable driving situation, or to perform a steering angle control depending on this value of the reference yaw rate.

Preferred embodiments particularly allow considering the tire resetting moment by way of a disturbance variable feed-forward system.

Further advantages and appropriate improvements of the invention can be seen in the subsequent description of preferred embodiments making reference to the Figures.

BRIEF DESCRIPTION OF THE DRAWINGS

Referring to the Figures.

DETAILED DESCRIPTION OF THE DRAWINGS

The invention is based on a two-axle, four-wheel motor vehicle with steerable wheels on a front axle. The steering system of the vehicle is preferably a rack-and-pinion steering system which is equipped with an electric power steering system. In the conventional operation of the power steering system, an EPS servo motor (EPS=Electric Power Steering) is used to apply an additional torque to the steering line, which boosts the steering torque applied by the driver. The steering request of the driver is determined by way of a hand steering moment $M_H$ which is measured by means of a torsion rod fitted into a steering rod of the steering system.

The electric power steering system is used to adjust an additional steering torque request $M_{DSR}$ (DSR=Driver Steering Recommendation) for assisting the driver, and is actuated to this end by a controller, e.g. by way of an interface to the CAN bus of the vehicle. The EPS servo motor is used as an actuator which introduces a steering torque $M_{DSR}$ (DSR=Driver Steering Recommendation) into the steering line which corresponds to a limited additional steering torque $\Delta M$.

However, the invention can be implemented in a similar way also in vehicles with other steering systems such as steering systems with hydraulic power steering or with steer-by-wire steering.

Figure 1:
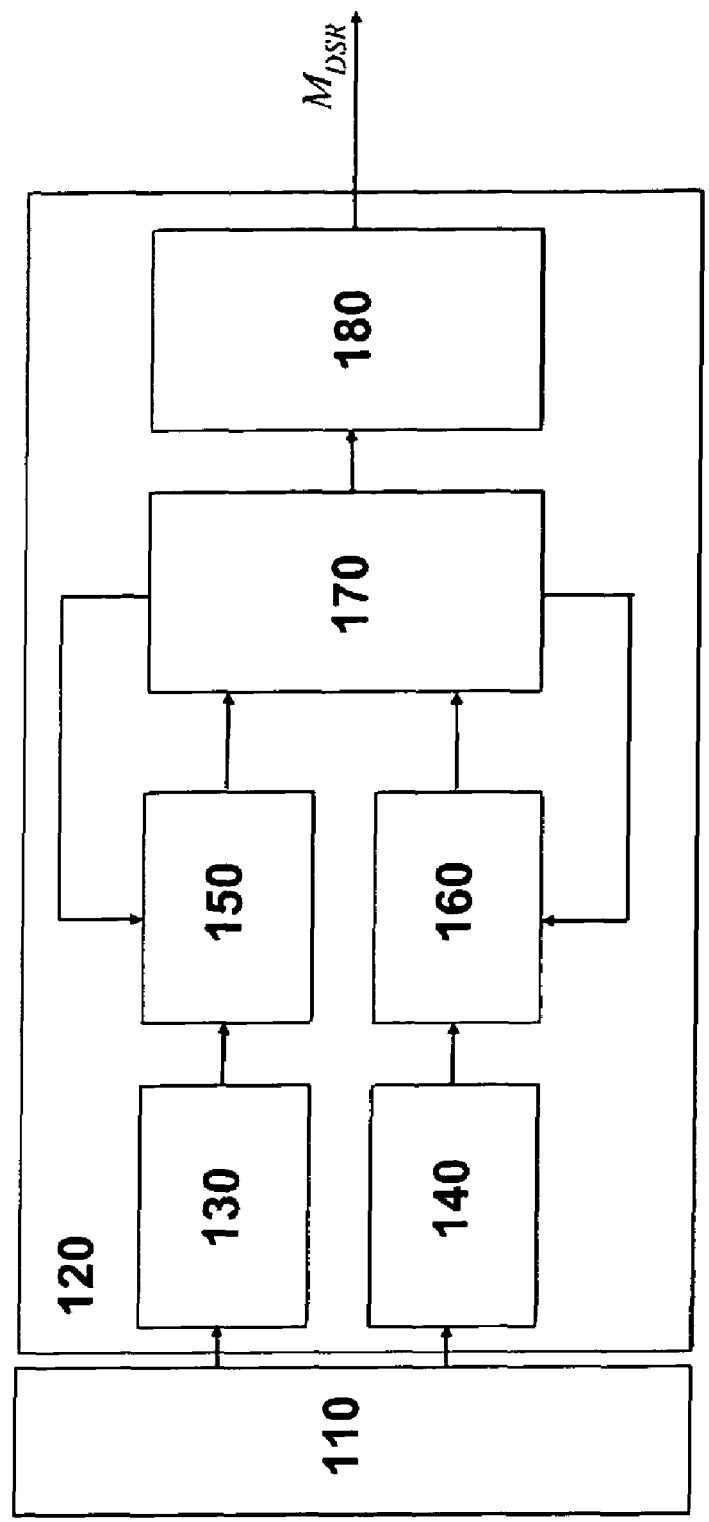
FIG. 1 is a schematic view of a control system for detecting an additional steering torque.

Referring to FIG. 1, the principal design of a steering line control system 120 for establishing the steering torque request $M_{DSR}$ is illustrated in a survey. Driving situations in which an unstable driving condition of the vehicles prevails are detected in blocks 130 and 140. These blocks fall back especially on information made available by a driving dynamics controller 110. The vehicle condition controller 110 e.g. concerns an ESP and/or an ABS system. A detection of critical driving situations in which the vehicle is oversteering is preferably performed in block 130. Understeering of the vehicle is detected in block 140.

In conformity with the detected unstable driving condition, a nominal steering angle $\delta_{nominal}$, which is determined in a manner adapted to the detected driving situation, is calculated in a controlling component of the control system in blocks 150 and 160.

When oversteering is detected, which can be caused by a load change or a brake operation in a curve, a nominal steering angle $\delta_{nominal}$ will be calculated in block 150 to stabilize a vehicle condition as quickly as possible.

A driving situation in which the vehicle is understeering typically can occur at high vehicle speeds and on roads with a low coefficient of friction such as on an icy roadway or in a hydroplaning situation. It is typical that steering movements can either influence a yaw movement of the vehicle in such a situation not at all, or only very insignificantly. In the event of a change of coefficient of friction from the low to a high coefficient of friction, steering movements of the driver can, however, cause vigorous reactions of the vehicle unexpected by the driver, as well as skidding. In an understeering situation, the target of the control therefore is to maintain the steering angle which prevails when the situation is detected, which is defined in block 160.

A steering angle controller 170 in which preferably a disturbance variable feed-forward is performed determines the additional steering torque ΔM, from which the assist torque $M_{DSR}$ is determined, which allows the driver to comfortably adjust the nominal steering angle $\delta_{nominal}$. In an understeering situation, the additional steering torque ΔM counteracts the steering movements in order to assist the driver in maintaining the instantaneous steering angle. As this occurs, blocks 150 and 160 can also transmit parameters of the controller 170 such as amplification factors or disturbances, in order to perform the control in the different driving situations in a manner in conformity therewith.

A situation-responsive limitation of the additional steering torque ΔM is performed in block 180. This process will limit the additional steering torque ΔM in particular to values allowing the driver to make steering movements which are not in conformity with the instructions of the control system 120. Thus, the driver will have full control of the vehicle at any time.

Figure 2:
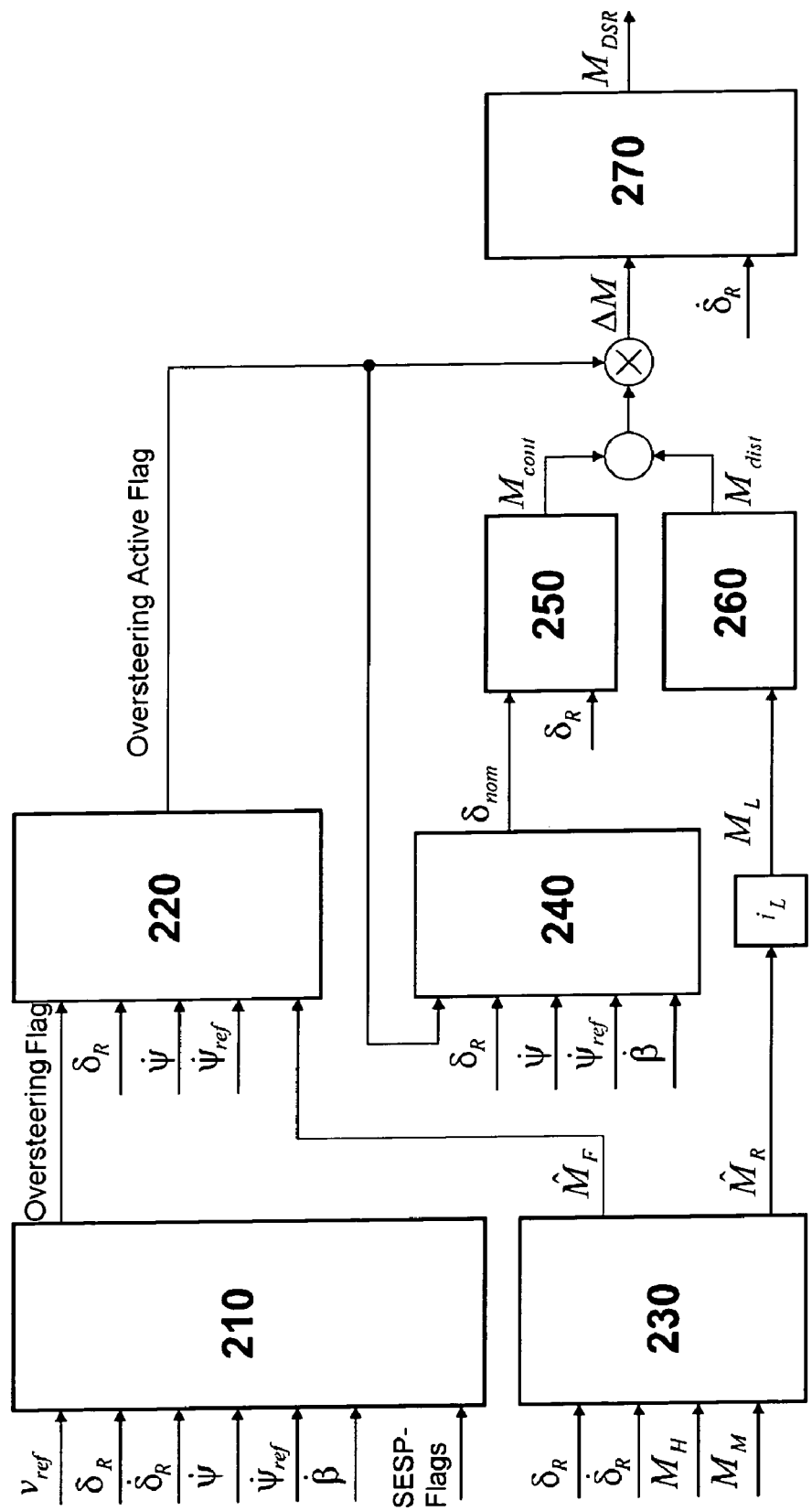
FIG. 2 is a block diagram with a general outlay of a control system for establishing an additional steering torque in an oversteering situation.

A preferred development of the component of the control system 120 carrying out the control in an oversteering situation, meaning in particular a component that contains the blocks 130, 150, 170 and 180 in the basic circuit diagram, is shown in a general view illustrated as a block diagram in FIG. 2.

The partial system comprises in particular a block 210 for detecting an oversteering situation, a block 220 which comprises a logic circuit for activating the control system, a block 230 for estimating disturbances such as in particular the tire resetting moment $M_R$ and the driver steering torque $M_F$, a block 240 for determining the nominal steering angle $\delta_{nominal}$, a steering angle controller 250, a block 260 for the disturbance variable feed-forward, and a block 270 for limiting the additional steering torque ΔM. The limited additional steering torque ΔM corresponds to the steering torque request $M_{DSR}$ to the EPS servo motor.

Figure 3:
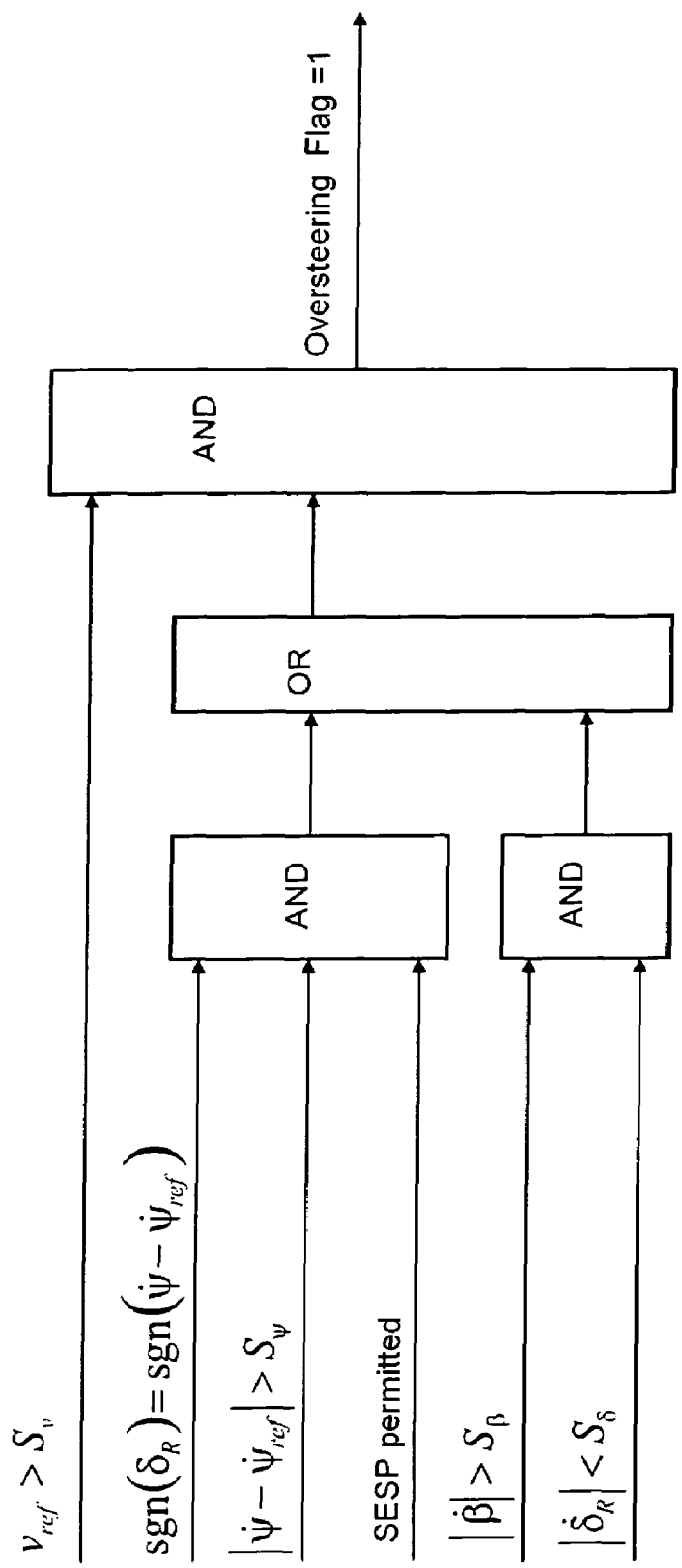
FIG. 3 is a development of a block of the block diagram illustrated in FIG. 2 for identifying the driving situation.

A favorable development of block 210 for detecting the oversteering situation is shown in FIG. 3. An oversteering situation is detected in block 210 when the reference speed $v_{ref}$ of the vehicle is higher than a predetermined threshold value $S_v$ and when at least one of the additional conditions that will be explained in the following is satisfied. The threshold value $S_v$ e.g. lies between 5 km/h and 20 km/h, preferably at 10 km/h.

A first additional condition for the detection of an oversteering situation is satisfied if the steering angle $\delta_R$ at the steerable wheels has the same sign as the difference $\dot{\psi}-\dot{\psi}_{ref}$ between the measured yaw rate $\dot{\psi}$ and a reference yaw $\dot{\psi}_{ref}$ calculated in a vehicle reference model, the amount of the difference $\dot{\psi}-\dot{\psi}_{ref}$ is higher than a predetermined threshold value $S_\psi$, and an SESP flag has the value 1.

It is ensured by item a) of the condition that the unstable driving situation concerns an oversteering situation and an unstable driving condition of a different type. The instantaneous driving situation is evaluated by way of item b) as to whether a critical driving condition prevails. The threshold value $S_\psi$ is preferably adapted to the instantaneous vehicle reference speed $v_{ref}$ and the instantaneously prevailing coefficient of friction, and e.g. the coefficient of friction estimated in an ESP system may become the basis in this case. The adaptation is preferably carried out by way of characteristic curves or a table.

The SESP flag is determined by another driving situation detection and assumes the value 1 when partial braking during straight travel or a cornering maneuver, or a load change during a cornering maneuver is detected. Otherwise, the SESP flag has the value O.

It is then determined by using the steering angle $\delta_R$ at the steerable wheels of the vehicle and its rate of change $\dot{\delta}_R$ as well as the measured lateral acceleration $a_y$ of the vehicle and by taking into consideration detection results of an ESP system, whether the vehicle is traveling straight ahead or in a curve.

Further, the brake pressure in the wheel brakes and its time variation are used to find out whether instability of the vehicle can occur by a brake intervention of the driver.

Based on the measured wheel speeds and based on the engine torque and its time variation or based on the accelerator pedal position and its time variation, it is further established whether instability can develop because the driver reduced the engine torque quickly.

Besides, the SESP flag is determined by way of an oversteering tendency, which is detected by way of the yaw rate $\dot{\psi}$ and its rate of change. In addition, it is checked for the coordination with ABS control interventions whether a rear wheel of the vehicle undergoes ABS control.

A second additional condition for the existence of an oversteering situation is satisfied if the rate of change $\dot{\beta}$ of the sideslip angle β is higher than a predetermined threshold value $S_\beta$, and the rate of change $\dot{\delta}_R$ of the steering angle $\delta_R$ is higher than a predetermined threshold value $S_\delta$.

This provision allows detecting oversteering situations at an early time which occur especially in rear-axle driven vehicles when the driver accelerates in a curve. The threshold values $S_\beta$ and $S_\delta$ are adapted to the respective vehicle type in driving tests.

When an oversteering situation is detected in block 210 by way of the conditions described hereinabove, an oversteering flag indicative of the output signal of block 210 is set to the value 1. The oversteering flag is reset from value 1 to value 0 as soon as the mentioned conditions are no longer satisfied. Preferably, however, lower threshold values are made the basis in this arrangement so that the control is stabilized by a hysteresis.

Figure 4:
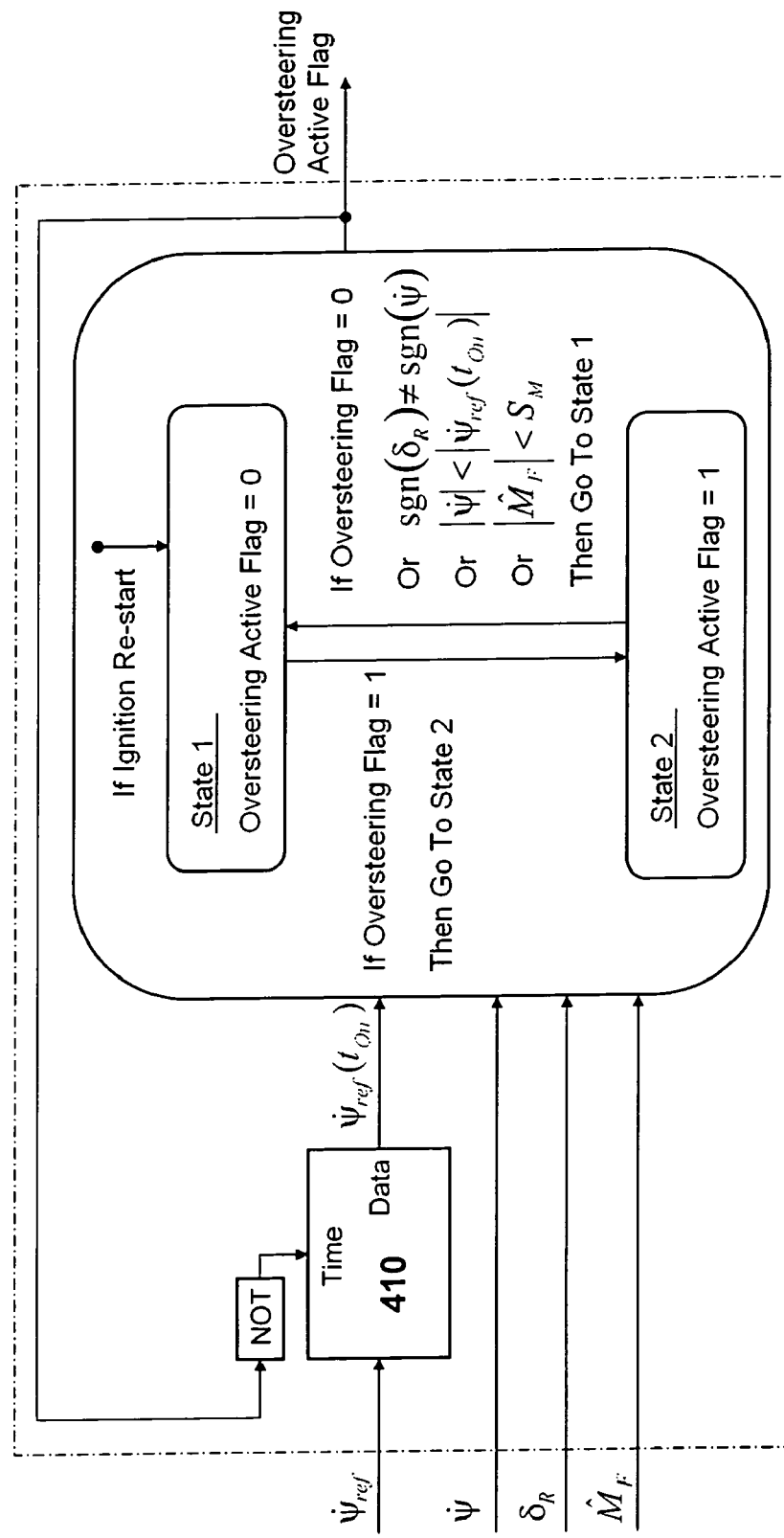
FIG. 4 is a development of a block of the block diagram illustrated in FIG. 2, which comprises an activation logic unit.

The oversteering flag serves as an input signal for block 220 which contains the activation logic for the control. A favorable design of this block is illustrated in FIG. 4.

When the ignition is re-started, an oversteering active flag which represents the output signal of block 220 is set to the value 0. A change to the value 1 is made when the oversteering flag has adopted the value 1.

Within block 220, a memory 410 is actuated by the oversteering active flag which is preferably configured as an edge-controlled hold buffer. When the value of the oversteering active flag changes from 0 to 1 at the time $t_{on}$, the value $\dot{\psi}_{ref}(t_{on})$ of the reference yaw rate $\dot{\psi}_{ref}$ is stored in the memory 410. This value of the reference yaw rate $\dot{\psi}_{ref}$ characterizes the steady state of the vehicle upon entry into the control at the time $t_{on}$ which is to be resumed by the control interventions.

When the oversteering active flag adopts the value 1, it will be reset to the value 0 if at least one of the following conditions is satisfied:

The oversteering flag assumes the value 0 (or changes its value from 1 to 0).

The sign of the steering angle $\delta_R$ is different from the sign of the measured yaw rate $\dot\psi$ of the vehicle (or the steering angle $\delta_R$ changes its sign compared to the sign of the yaw rate $\dot\psi$).

The actual value of the measured yaw rate $\dot\psi$ irrespective of the sign is lower than the value $\dot\psi_{ref}(t_{on})$ of the reference yaw rate $\dot\psi_{ref}$ (or drops below this value).

According to the condition a) the control interventions are discontinued in the absence of an oversteering situation. Condition b) is only satisfied if the driver acts very vigorously and excessively during the control. A critical driving situation which results therefrom causes an ESP control intervention stabilizing the vehicle. In order to avoid problems of coordination between the steering angle control under review and the ESP control interventions, the oversteering active flag is reset to the value 0 in this case.

On account of the condition c) the steering angle control is deactivated when the vehicle has been stabilized. In this arrangement, the value $\dot\psi_{ref}(t_{on})$ instead of the instantaneous value of the reference yaw rate $\dot\psi_{ref}$ is made the basis for characterizing a stable driving condition in order to avoid again reciprocal influencing of the steering angle control and the ESP control.

Such an influence develops because the reference yaw rate $\dot\psi_{ref}$ is influenced by the steering movements performed by the driver due to the assistance of the additional steering torque $\Delta M$. The reciprocal influencing between the value of the additional steering torque $\Delta M$ and the value of the reference yaw rate $\dot\psi_{ref}$ can increase the yaw rate deviation of the vehicle so that oscillations of the reference yaw rate $\dot\psi_{ref}$ can develop with a rising amplitude. It may occur that the vehicle 'builds up' in this respect due to the corresponding control interventions of the steering angle control and the ESP system.

However, the condition of termination c) enabled a stable control in which the problems of coordination are avoided.

In a favorable embodiment of the invention, the oversteering flag is additionally reset to the value 0 when the estimated driver steering torque $\hat M_F$ applied by the driver is smaller than a threshold value $S_M$. According to this condition, a situation is detected in which the driver no longer holds the steering wheel. The detection must be founded on an estimated value $\hat M_F$ for the driver steering torque $M_F$ because the hand moment $M_H$ measured in the steering line is also influenced by the control interventions performed by the EPS servo motor. The driver steering torque $M_F$ is then estimated in block 230.

Figure 5:
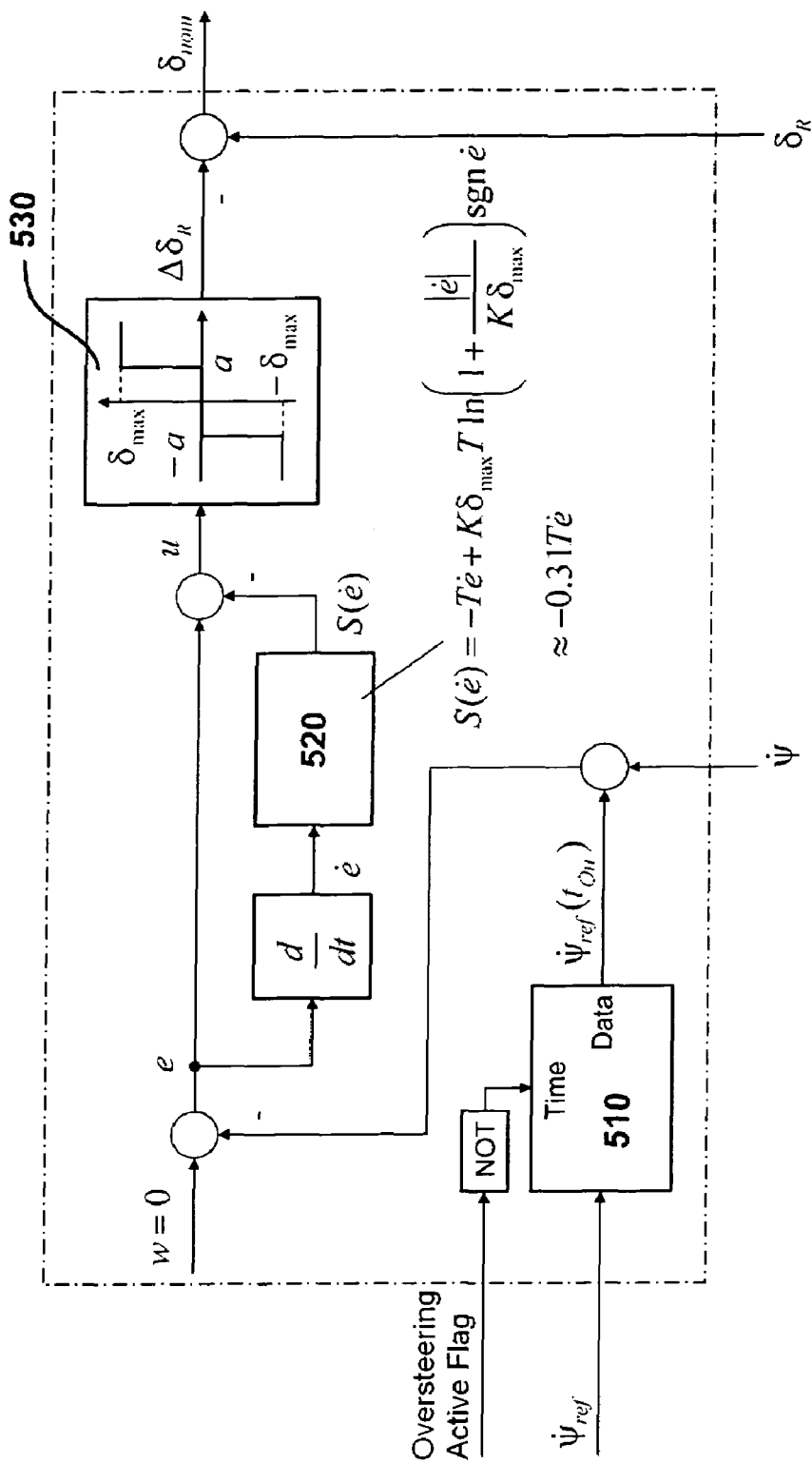
FIG. 5 is a first embodiment of a block of the block diagram illustrated in FIG. 2 for establishing the nominal steering angle.

Block 240 is provided to determine the nominal steering angle $\delta_{nominal}$, and the driver shall be supported by the control in adjusting the latter steering angle. A preferred embodiment of this block, which is based on a time-optimal control, is illustrated in FIG. 5.

In this embodiment, initially a nominal additional steering angle $\Delta\delta_R$ is determined from the difference $\dot\psi - \dot\psi_{ref}(t_{on})$ between the measured yaw rate $\dot\psi$ of the vehicle and the reference yaw rate $\dot\psi_{ref}$ defined at time $t_{on}$. The nominal steering angle $\delta_{nominal}$ is achieved by subtraction:

$$\delta_{nominal} = \delta_R - \Delta\delta_R$$

The reference yaw rate is provided by a memory 510 which is in turn configured preferably as a hold buffer and driven by the oversteering active flag.

The determination of the additional steering angle $\Delta\delta_R$ is founded on a model of an oversteering vehicle wherein the yaw rate difference $\dot\psi - \dot\psi_{ref}(t_{on})$ rises with an increasing additional steering angle $\Delta\delta_R$. In particular, a model with the following transfer function $G(s) = L\{\dot\psi - \dot\psi_{ref}(t_{on})\}/L\{\Delta\delta_R\}$ is chosen herein, with $L\{\bullet\}$ referring to the Laplace transform of:

$$G(s) = \frac{K}{s(1+sT)}$$

Based on this model a control variable u is determined from a difference between the input $e = \dot\psi_{ref}(t_{on}) - \dot\psi$ and the variable $S(\dot e)$ which is established in the switching line 520. It applies:

$$S(\dot e) = -T\dot e + K\delta_{max}T\ln\left(1 + \frac{|\dot e|}{K\delta_{max}}\right)\text{sgn}(\dot e)$$

Preferably a linearized form of the switching line 520 is used herein, and it applies:

$$S(\dot e) \approx -0.31 T\dot e$$

The parameter T may be adapted in driving tests, for example.

The additional steering angle $\Delta\delta_R$ is determined by way of a three-point characteristic curve in block 530. The value $\delta_{max}$ defines the maximum allowable amount of the additional steering angle $\Delta\delta_R$. In addition, block 530 transmits only such control variables u, the absolute values of which irrespective of the sign are higher than an insusceptibility parameter a. This measure serves to stabilize the control.

Figure 6:
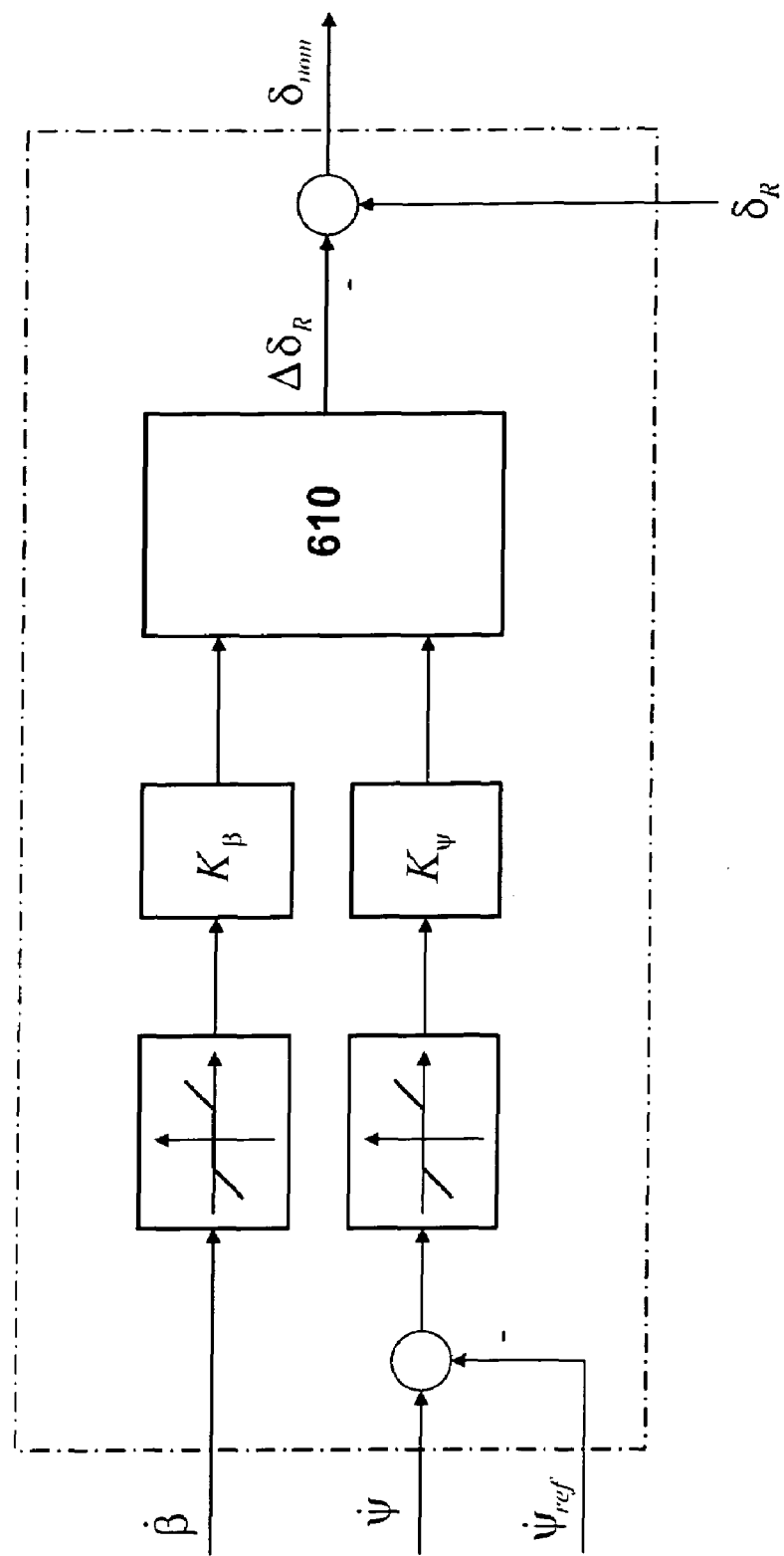
FIG. 6 is a second embodiment of a block of the block diagram illustrated in FIG. 2 for determining the nominal steering angle.

Another preferred embodiment of block 240 for determining the nominal steering angle $\delta_{nominal}$ is illustrated in FIG. 6. Herein, the nominal additional steering angle $\Delta\delta_R$ is determined from the sideslip angle velocity $\dot\beta$ amplified by factor $K_\beta$ and the difference $\dot\psi - \dot\psi_{ref}$ between the measured yaw rate $\dot\psi$ of the vehicle and the reference yaw rate $\dot\psi_{ref}$ amplified by way of a factor $K_\psi$. Arbitration takes place in block 610 which is preferably executed by way of summation of the described input variables of block 610 or by way of the formation of maximum values.

The nominal steering angle $\delta_{nominal}$ in this embodiment is also determined as a difference between the steering angle $\delta_R$ at the steerable wheels and the established steering angle variation $\Delta\delta_R$.

It is the purpose of block 230 in FIG. 2 to estimate the tire resetting moment $M_R$, which acts on the steering line and is brought about by the cornering forces and lateral forces of the tires and counteracts the hand steering moment $M_H$, and to estimate the hand steering moment $M_F$ applied by the driver. Linear disturbance observers are used for this estimation in a favorable embodiment of the invention.

Figure 7:
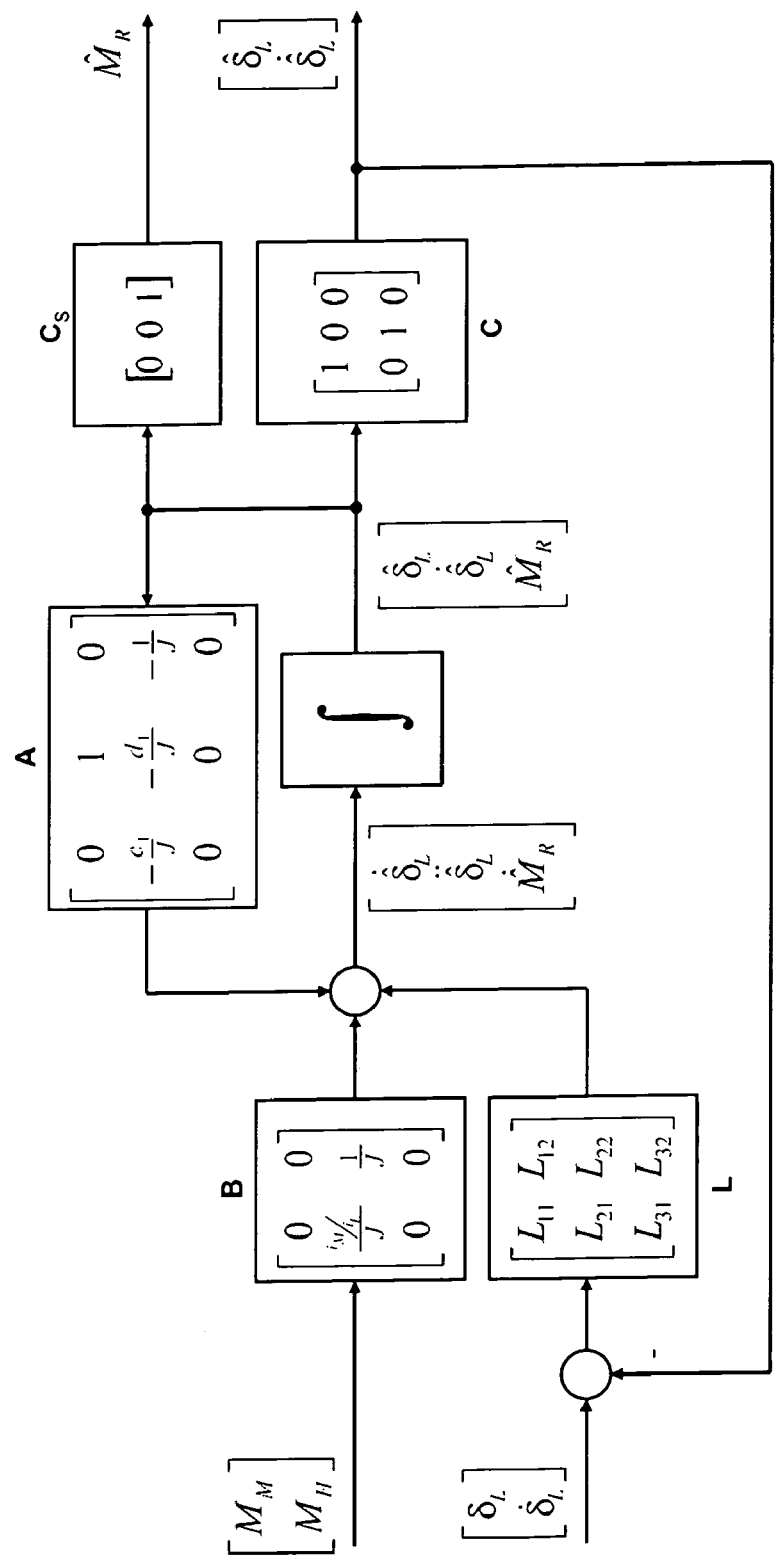
FIG. 7 is a first development of a block of the block diagram illustrated in FIG. 2 for estimating the tire resetting moment.

The disturbance observer unit illustrated in FIG. 7 and arranged to estimate the tire resetting moment $M_R$ is founded on the following model equation of the steering system:

$$\ddot\delta_L = \frac{1}{J}\left(\frac{i_M}{i_L}M_M + M_H - M_{IR} - M_R\right) \qquad (1)$$

In this equation, J designates the inertia moment of the steering line, $M_M$ designates the steering torque generated by the EPS servo motor, which can be determined from the input current of the motor, for example, $i_L = \delta_L/\delta_R$ designates the transmission ratio between the steering angle $\delta_L$ at the steering column and the steering angle $\delta_R$ at the steerable wheels of the vehicle, and $i_M = \delta_M/\delta_R$ designates the transmission ratio between the control angle $\delta_M$ of the EPS servo motor and the steering angle $\delta_R$ at the steerable wheels. The evaluation by way of equation 1 relates to the steering column.

The moment $M_{IR}$ in equation 1 takes into account a viscous friction within the steering line that is proportional to the steering angle velocity $\dot{\delta}_L$ and is produced due to sliding on a lubricated surface, as well as a resetting moment within the steering line (resilient effect) connected to an excursion and being proportional to the steering angle $\delta_L$. Thus, the moment $M_{IR}$ has the formula:

$$M_{IR} = c_1 \delta_L + d_1 \dot{\delta}_L \quad (2)$$

The proportionality constants $c_1$ and $d_1$ as well as the inertia moment J may be established in driving tests.

By way of equation 1, the disturbance observer unit calculates an estimated steering angle acceleration $\tilde{\delta}_L$. A first integration allows receiving therefrom an estimated value $\hat{\dot{\delta}}_L$ for the steering angle velocity $\dot{\delta}_L$, another integration furnishes an estimated steering angle $\hat{\delta}_L$ from the estimated steering angle velocity $\hat{\dot{\delta}}_L$.

The time derivative $\hat{\dot{M}}_R$ of the estimated value $\hat{M}_R$ for the tire resetting moment $M_R$ is established in the disturbance observer unit from the difference between the estimated steering angle $\hat{\delta}_L$ and the measured steering angle $\delta_L$ and from the difference between the estimated steering angle velocity $\hat{\dot{\delta}}_L$ and the steering angle velocity $\dot{\delta}_L$ derived from the test values of the steering angle sensor, which are fed back to the input of the disturbance observer unit by way of an amplification matrix L. Thus, it applies:

$$\hat{\dot{M}}_R = L_{31}(\delta_L - \hat{\delta}_L) + L_{32}(\dot{\delta}_L - \hat{\dot{\delta}}_L)$$

In addition, the estimated steering angle acceleration $\tilde{\delta}_L$ and the estimated steering angle velocity $\hat{\dot{\delta}}_L$ can be adapted directly by way of the amplification matrix L based on the differences between the estimated variables $\hat{\delta}_L$ and $\hat{\dot{\delta}}_L$ and the corresponding variables $\delta_L$ and $\dot{\delta}_L$ determined from the measuring signals.

Standard methods of control theory may be used to rate the amplifications $L_{ij}$ of the amplification matrix L. They can be determined by pole placement.

Figure 8:
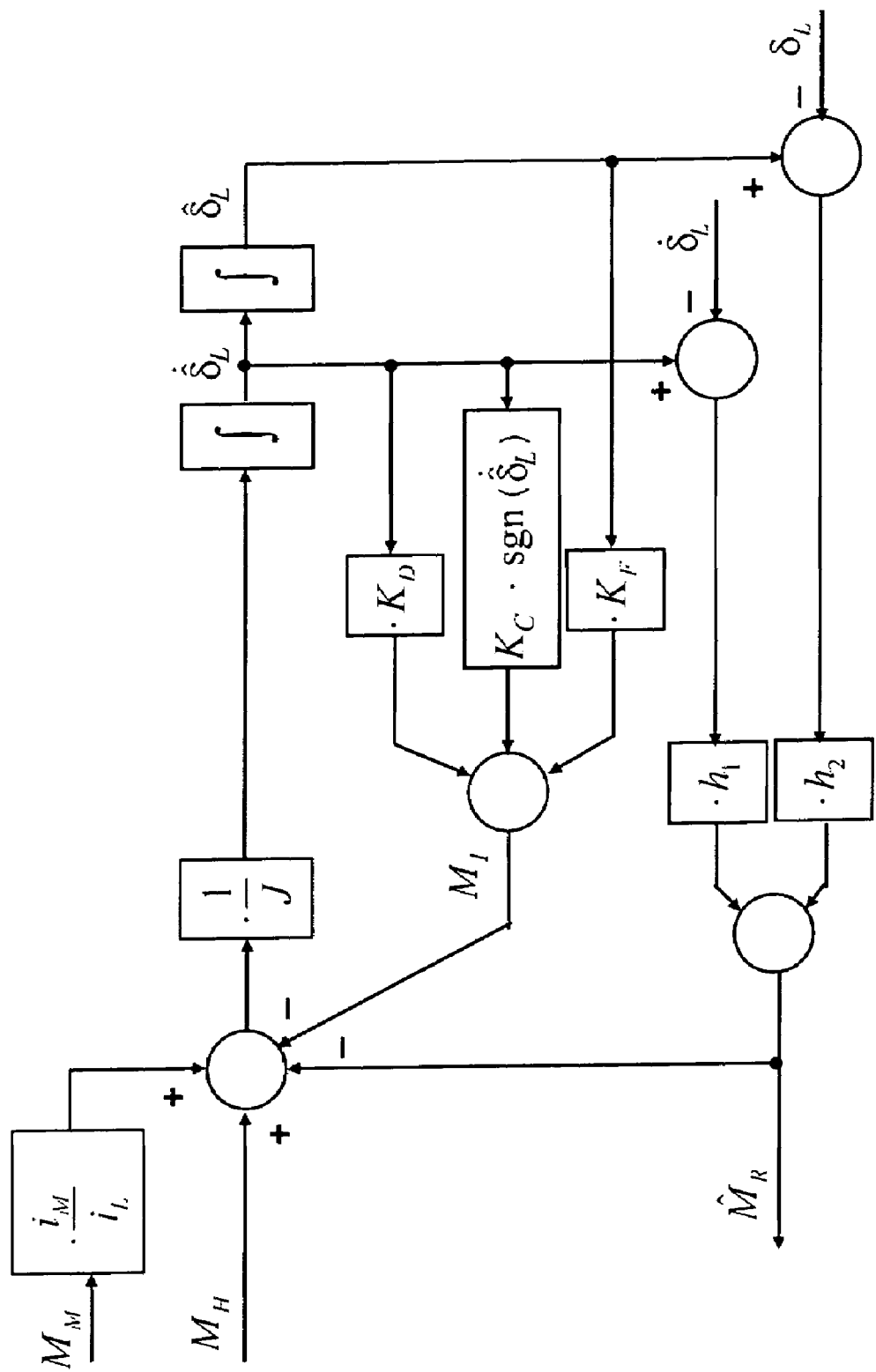
FIG. 8 is a second development of a block of the block diagram illustrated in FIG. 2 for estimating the tire resetting moment.

In another favorable embodiment of the invention, it is arranged for to use a non-linear disturbance observer unit according to FIG. 8 in order to estimate the tire resetting moment $M_R$.

The estimation is based on a model of the steering line in which, in addition to the variables being used in the model described hereinabove, Coulomb's friction is taken into account which is produced when sliding on a dry contact surface. The inner steering torque developing due to friction assumes a configuration of $$M_{IR} = K_F \delta_L + K_D \dot{\delta}_L + K_C \text{sgn}(\dot{\delta}_L) \quad (3)$$

in this model.

The observer unit illustrated in FIG. 8 in turn is founded on the model equation 1 into which the inner steering torque is inserted corresponding to equation 4. The estimated steering angle velocity $\hat{\dot{\delta}}_L$ as well as the estimated steering angle $\hat{\delta}_L$ are determined also in this case by way of integration from the estimated steering angle acceleration $\tilde{\delta}$.

$$\hat{\dot{\delta}}_L = \int \tilde{\ddot{\delta}}_L dt \text{ and } \hat{\delta}'_L = \int \hat{\dot{\delta}}_L dt$$

The tire resetting moment $\hat{M}_R$ herein results from the difference between the estimated steering angle velocity $\hat{\dot{\delta}}_L$ and the measured steering angle velocity $\dot{\delta}_L$ as well as the difference between the estimated steering angle $\hat{\delta}_L$ and the measured steering angle $\delta_L$ and is fed back to the input of the disturbance observer unit:

$$\hat{\dot{M}}_R = h_1 \cdot (\hat{\dot{\delta}}_L - \dot{\delta}_L) + h_2 \cdot (\hat{\delta}_L - \delta_L)$$

The amplification factors $h_1$ and $h_2$ are determined in driving tests in an appropriate fashion so that the system is especially stable and sufficiently exact values of the tire resetting moment $M_R$ can be estimated.

The estimated tire resetting moment $\hat{M}_R$ corresponds to the load moment $M_{load}$ that acts on the steering line. Multiplication with a factor $i_L$ allows relating this load moment $M_{load}$, which is herein determined in relation to the steering rod, to the steerable wheels of the vehicle.

Figure 9:
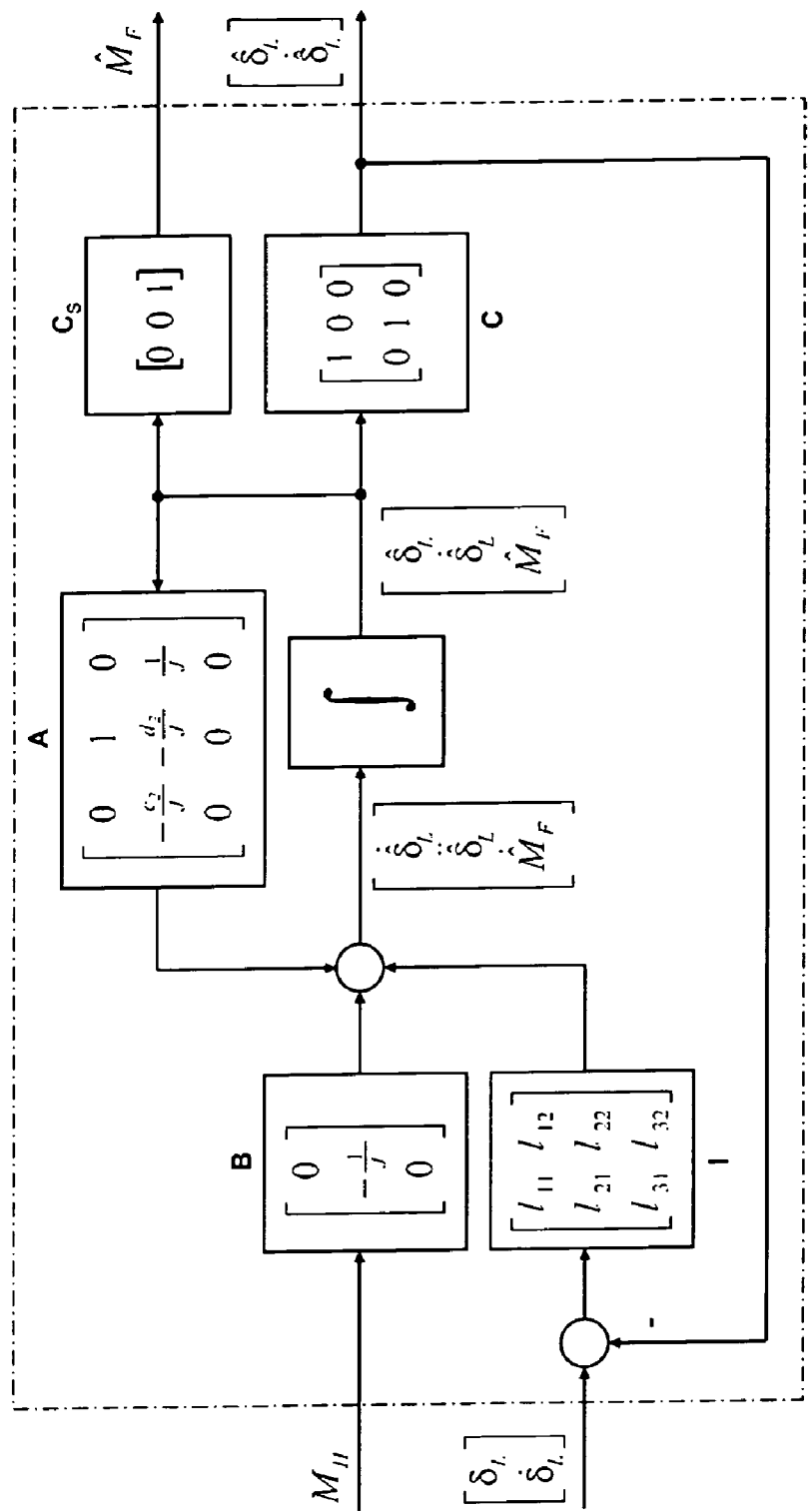
FIG. 9 is a development of a block of the block diagram illustrated in FIG. 2 for estimating a steering torque of a driver.

The driver steering torque $M_F$ is estimated preferably in a way similar to the estimation of the tire resetting moment $M_R$ by means of a linear disturbance observer unit which is illustrated in FIG. 9. The disturbance observer unit is founded on the following model equation for the rotational behavior of the steering wheel, into which in particular the difference between the driver steering torque $M_F$ and the measured hand steering torque $M_H$ is included:

$$\ddot{\delta}_L = \frac{1}{J}(M_F - M_H - c_2 \delta_L - d_2 \dot{\delta}_L) \quad (4)$$

In turn, a viscous friction and a resilient effect are taken into account in the term $c_2 \delta_L + d_2 \dot{\delta}_L$.

For the calculation of the estimated driver steering torque $\hat{M}_F$ by way of equation 4, in turn the estimated steering angle acceleration $\tilde{\ddot{\delta}}_L$, the estimated steering angle velocity $\hat{\dot{\delta}}_L$ and the estimated steering angle $\hat{\delta}_L$ at the steering wheel are used.

The time derivative $\hat{\dot{M}}_F$ of the estimated driver's steering torque $\hat{M}_F$ is determined in the disturbance observer unit similar to the derivative $\hat{\dot{M}}_R$ of the estimated tire resetting moment $\hat{M}_R$ in FIG. 7 from the difference between the estimated steering angle $\hat{\delta}_L$ and the measured steering angle $\delta_L$ and from the difference between the estimated steering angle velocity $\hat{\dot{\delta}}_L$ and the steering angle velocity $\dot{\delta}_L$ derived from the measured values of the steering angle sensor, being fed back to the input of the disturbance observer unit by way of an amplification matrix 1. It thus applies:

$$\hat{\dot{M}}_F = l_{31}(\delta_L - \hat{\delta}_L) + l_{32}(\dot{\delta}_L - \hat{\dot{\delta}}_L)$$

From this results the estimated driver steering torque $\hat{M}_F$ by integration.

As has been explained hereinabove, it can be determined from the estimated driver steering torque $\hat{M}_F$, whether the driver releases the steering wheel during a control intervention.

The additional steering torque $\Delta M$ is estimated by way of a steering angle control in block 250 and a disturbance variable feed-forward by block 260.

Figure 10:
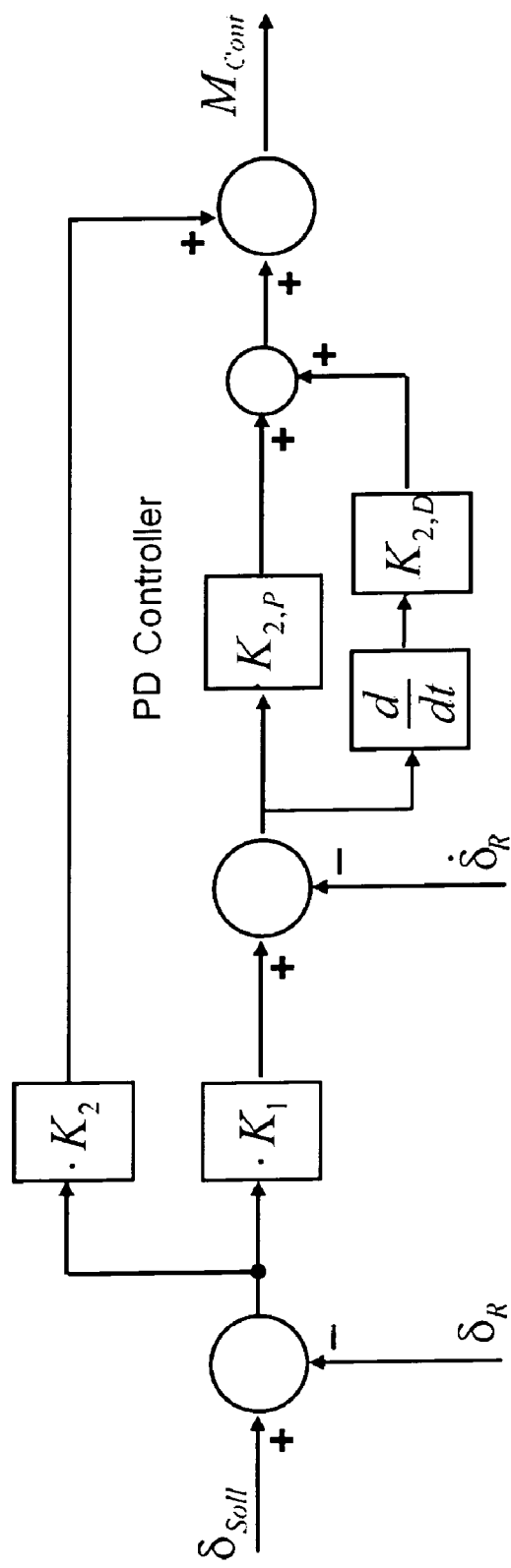
FIG. 10 shows a development of a steering angle controller.

A block diagram of a favorable controller 250 is shown in FIG. 10. The control component $M_{Reg}$ of the additional steering torque $\Delta M$ is determined from the sum of a first component and a second component in the illustrated embodiment of the controller 250.

The first component is defined by an amplification of the deviation between the nominal steering angle $\delta_{nominal}$ and the instantaneously prevailing steering angle $\delta_R$ at the steerable wheels of the vehicle with a predetermined factor $K_2$ by means of a proportional controller.

The second component results from a deviation of the steering angle velocity $\dot{\delta}_R$ and is defined in a branch of the controller 250 which is designed as a cascade controller. The command variable for an inner controller is established by a multiplication of the deviation $\delta_{nominal}-\delta_R$ of the steering angle with a predefined factor $K_1$ and corresponds to a nominal steering angle variation. The deviation results accordingly from the difference $K_1(\delta_{nominal}-\delta_R)-\dot{\delta}_R$ between the established nominal steering angle variation and the steering angle velocity $\dot{\delta}_R$ determined from the measured values of the steering angle sensor.

The inner controller of the cascade controller is preferably designed as a PD controller so that the second component of the control component $M_{reg}$ of the additional steering torque is achieved as follows:

$$K_{2,P} \cdot \left[K_1 \cdot (\delta_{Soll} - \delta_R) - \dot{\delta}_R\right] + K_{2,D} \cdot \frac{d}{dt}\left[K_1 \cdot (\delta_{Soll} - \delta_R) - \dot{\delta}_R\right]$$

This second component of the control component $M_{reg}$ of the additional steering torque renders it possible for the system to intervene very quickly and effectively when the difference between the nominal steering angle $\delta_{nominal}$ and the instantaneous steering angle $\delta_R$ is increased by steering movements of the driver.

Figure 11:
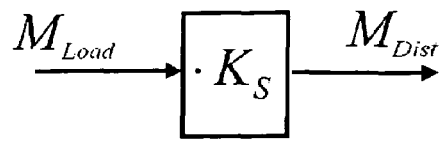
FIG. 11 is a development of a block of the block diagram illustrated in FIG. 2 for the disturbance variable feed-forward system.

The component $M_{disturb}$ of the additional steering torque $\Delta M$ is achieved from the estimated load steering torque $M_{load}$ amplified with a factor $K_S$ and is defined in block 260 that is illustrated in a block diagram in FIG. 11. The consideration of the component $M_{disturb}$ corresponds to a disturbance variable feed-forward, which allows considering the road conditions in this case, yet enables performing steering angle control in a simple fashion irrespective of this influence.

The components $M_{reg}$ and $M_{disturb}$ are added to determine the additional steering torque $\Delta M$. Further, the sum is multiplied with the oversteering active flag defined by the activation logic in block 220 so that the additional steering torque is transmitted to the ESP servo motor only when the oversteering active flag assumes the value 1.

Figure 12:
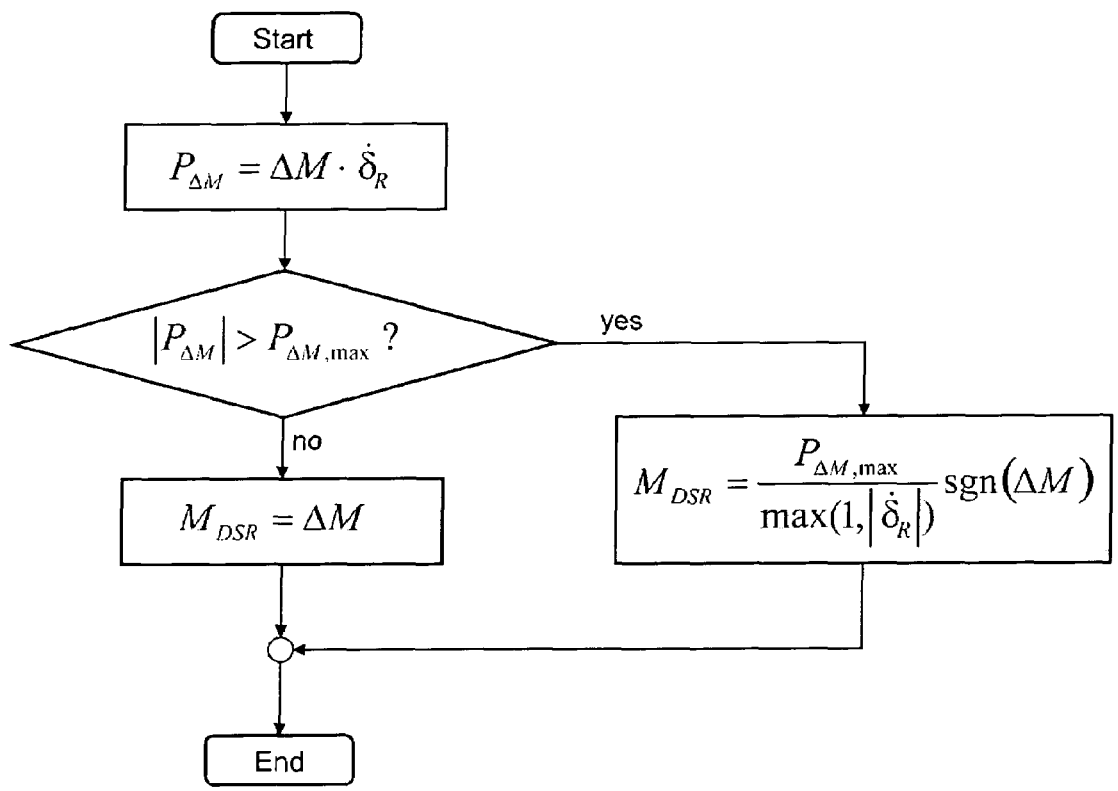
FIG. 12 illustrates a limitation of the additional steering torque.

Besides, the additional steering torque is limited in block 270. A favorable development of this block is depicted in FIG. 12.

As this occurs, the capacity $P_{\Delta M}=\Delta M \cdot \dot{\delta}_R$ of the control intervention is initially calculated from the additional steering torque $\Delta M$ and the steering angle velocity. When the absolute value of the latter irrespective of the sign exceeds a predefined value $P_{\Delta M,max}$, then the assist torque $M_{DSR}$ which is applied to the steering line by way of the EPS servo motor is limited to the following value:

$$M = \frac{P_{\Delta M,\max}}{\max(1, |\dot{\delta}_R|)} \text{sgn}(\Delta M)$$

If this is not the case, the steering torque requirement $M_{DSR}$ to the servo motor corresponds to the additional steering torque $\Delta M$.

This limitation is especially favorable if it is dispensed with to detect whether the driver let go the steering wheel.

Figure 13:
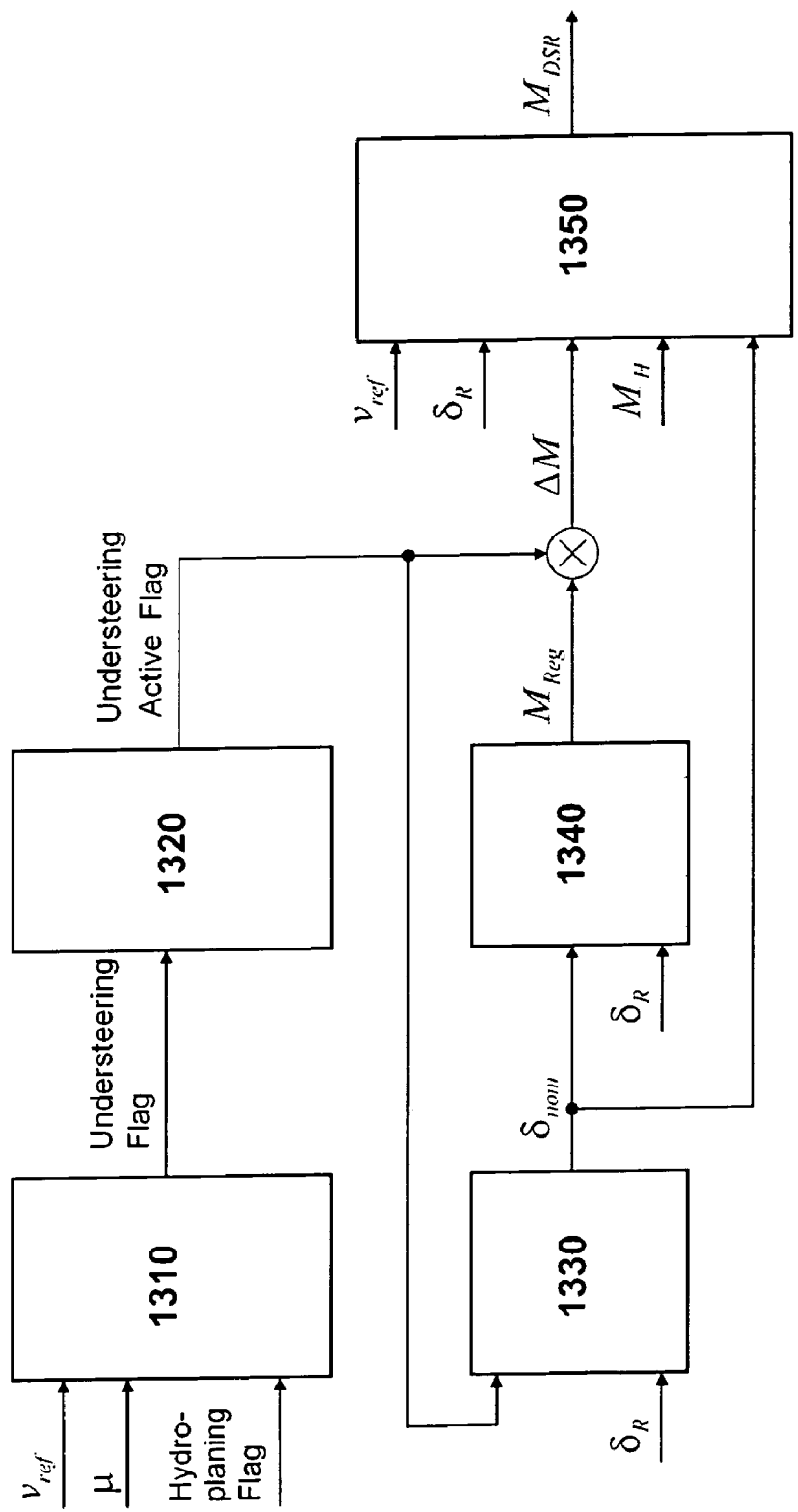
FIG. 13 is a block diagram with a general outlay of a control system for establishing an additional steering torque in an understeering situation.

A preferred embodiment of the component of the control system 120 which performs the control in an understeering situation is shown in a block diagram view in FIG. 13.

The partial system comprises in particular a block 1310 for detecting an understeering situation, a block 1320 which comprises a logic circuit for activating the control system, a block 1330 for determining a nominal steering angle $\delta_{nominal}$, a steering angle controller 1340 as well as a block 1350 for limiting the additional steering torque $\Delta M$.

Figure 14:
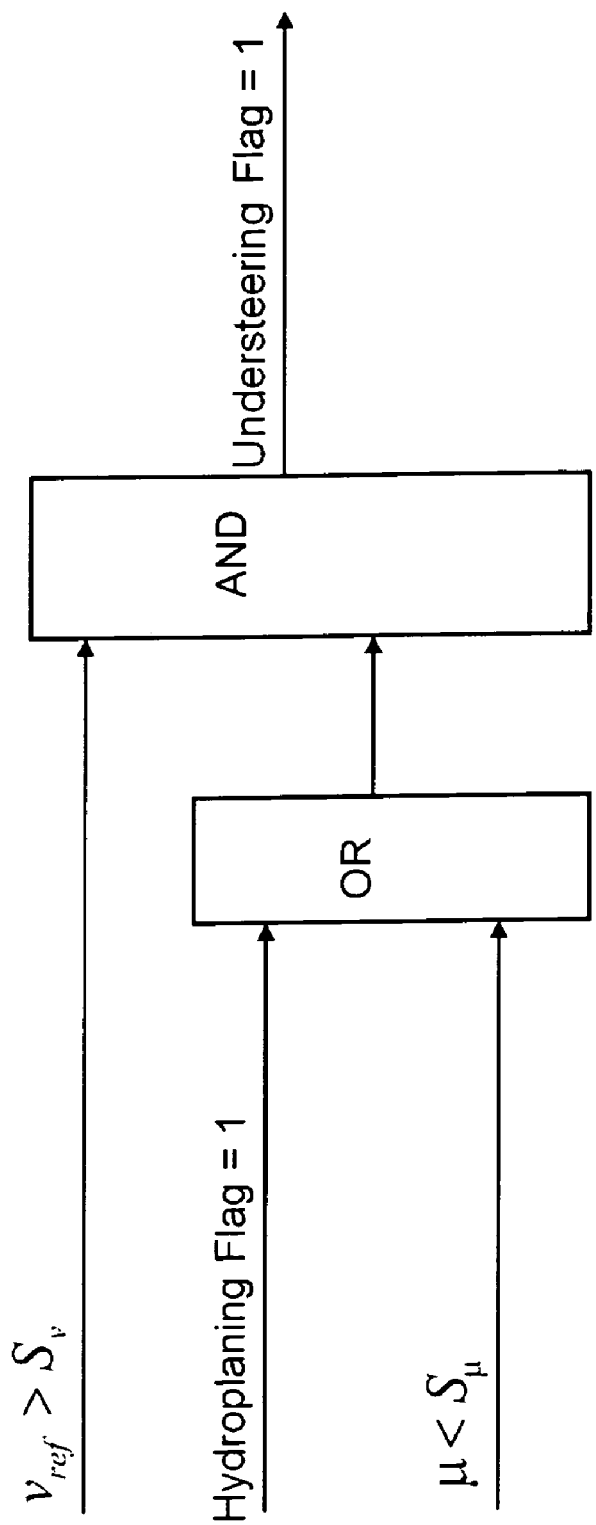
FIG. 14 is a development of a block of the block diagram illustrated in FIG. 13 for identifying the driving situation.

A favorable embodiment of block 1310 for detecting the understeering situation is illustrated in FIG. 14. An understeering situation is detected in block 1310 when the reference speed $v_{ref}$ of the vehicle exceeds a predetermined threshold value $S_v$, which ranges between 60 km/h and 120 km/h and preferably is at 80 km/h, and when at least one of the following conditions is satisfied in addition:

A hydroplaning flag has the value 1.

An instantaneously prevailing coefficient of friction $\mu$ of the roadway is lower than a predetermined threshold value $S_\mu$.

The hydroplaning flag is set to the value 1, preferably by an ESP system of the vehicle when detecting a hydroplaning situation. Preferably, likewise the value estimated by an ESP system is taken as the instantaneous value $\mu$ of the coefficient of friction of the roadway. The threshold value $S_\mu$ for the coefficient of friction $\mu$ e.g. lies between 0.05 and 0.2, preferably at 0.1.

When an understeering situation is detected in block 1310, an understeering flag which illustrates the output signal of block 1310 is set to the value 1. When an understeering situation is not detected in view of the conditions described hereinabove, the understeering flag adopts the value 0.

Figure 15:
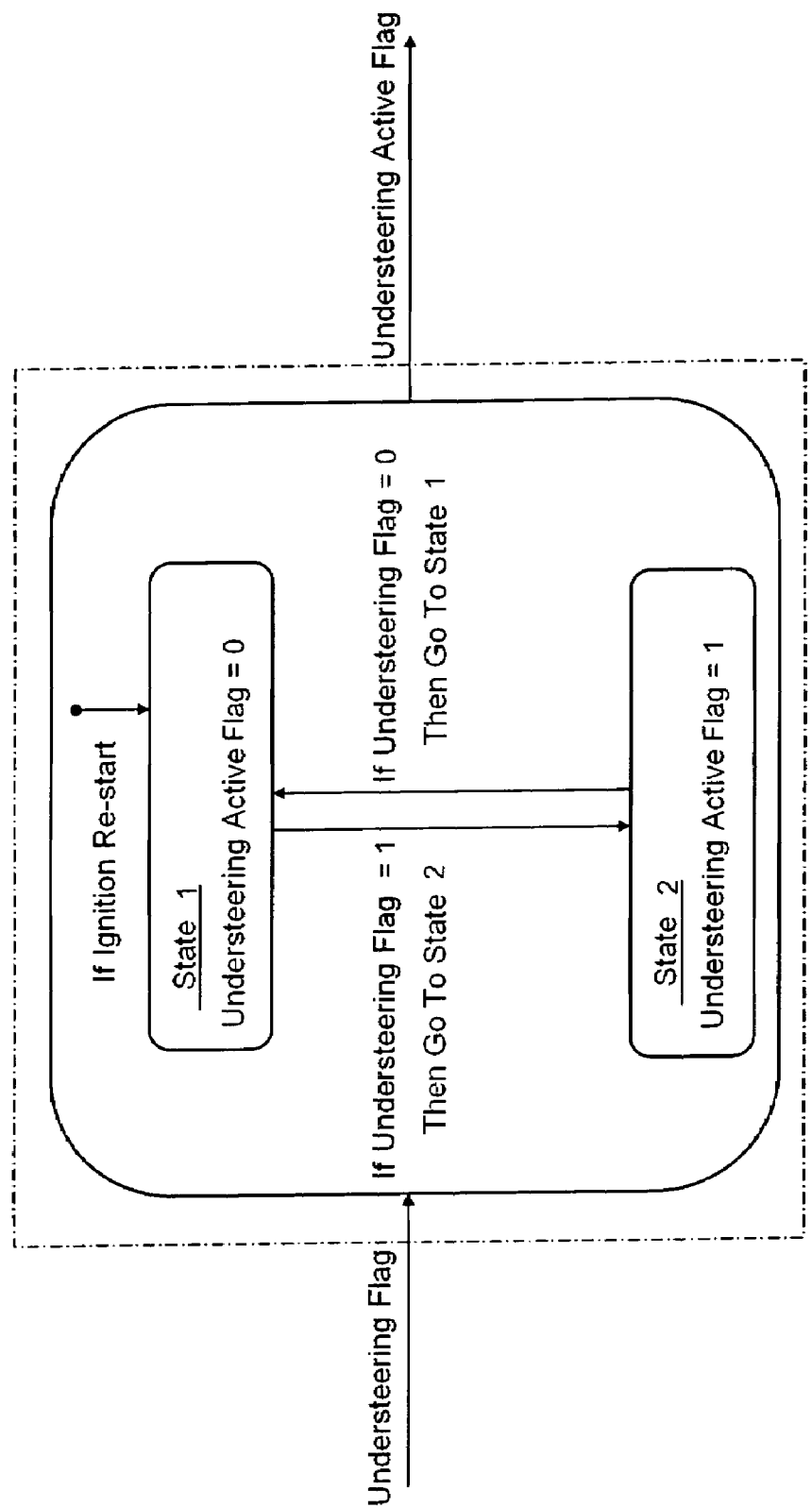
FIG. 15 is a development of a block of the block diagram illustrated in FIG. 13, which comprises activation logic.

The understeering flag serves as an input signal for block 1320 which contains the activation logic of the control. A preferred development of block 1320 is depicted in FIG. 15.

When the ignition is re-started, the block sets an understeering active flag to value 0. The value 0 is changed to the value 1 only when the understeering flag assumes the value 1.

When the oversteering active flag adopts the value 1, it will be reset to the value 0 as soon as the understeering flag adopts the value 0.

Figure 16:
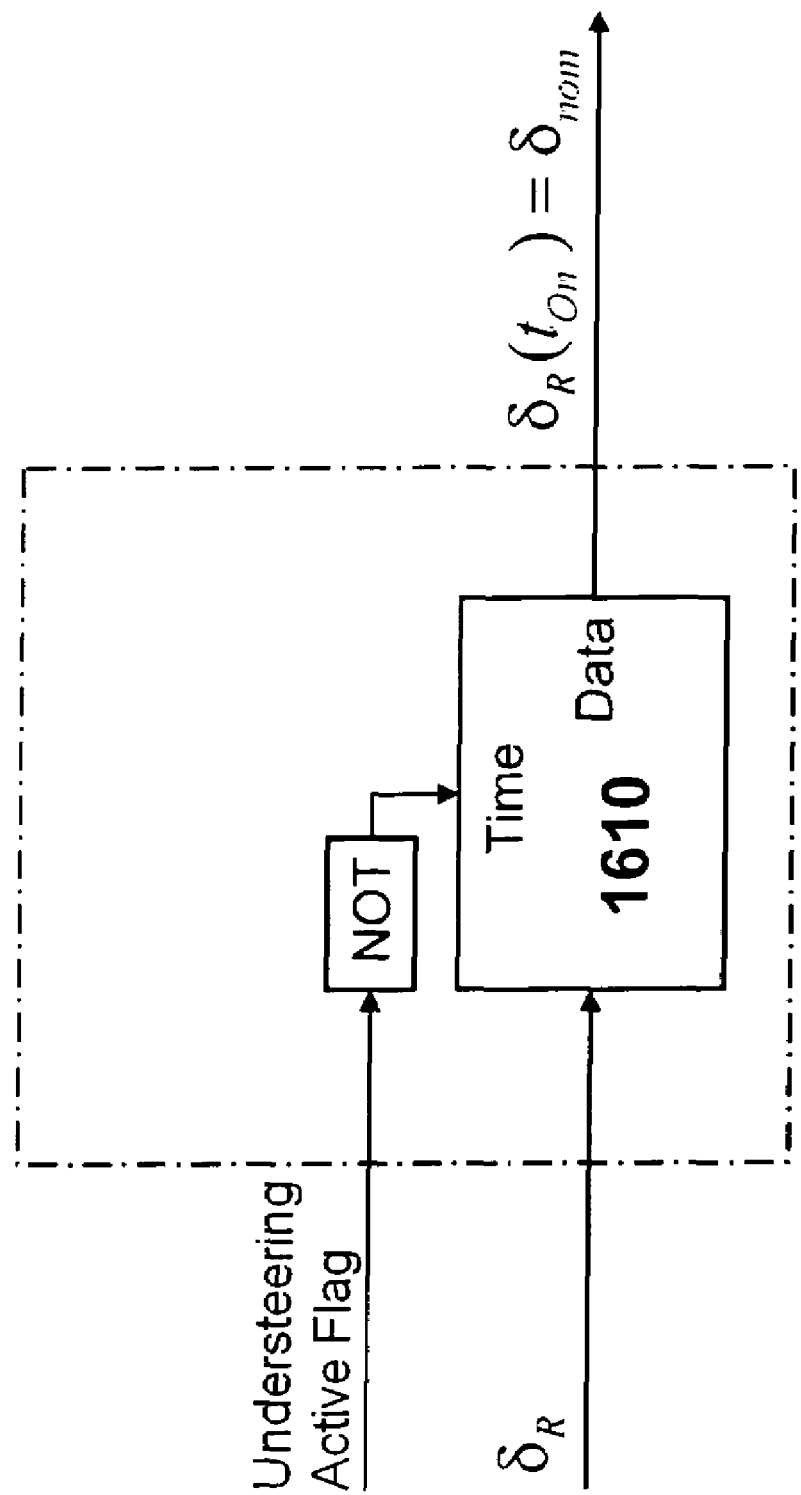
FIG. 16 is a development of a block of the block diagram illustrated in FIG. 13 for determining the nominal steering angle.

The nominal steering angle $\delta_{nominal}$, whose adjustment by the driver shall be supported by the control, is established in block 1330. A preferred embodiment of block 1330 is illustrated in FIG. 16.

Block 1330 comprises a memory 1610, which is preferably configured as an edge-controlled hold buffer and is actuated by the oversteering active flag. When the value of the oversteering active flag changes from the value 0 to the value 1 at the time $t_{on}$, the value $\delta_R(t_{on})$ of the steering angle $\delta_R$ at the steerable wheels of the vehicle which prevails at time $t_{on}$ is stored in the memory 1610 and output from block 1330 as nominal steering angle $\delta_{nominal}$.

The additional steering torque $\Delta M$ is determined by a multiplication of a control component $M_{reg}$ with the understeering active flag and thus adopts the value $M_{reg}$ when the understeering active flag has the value 1. Otherwise, the additional steering torque $\Delta M$ assumes the value 0.

Figure 17:
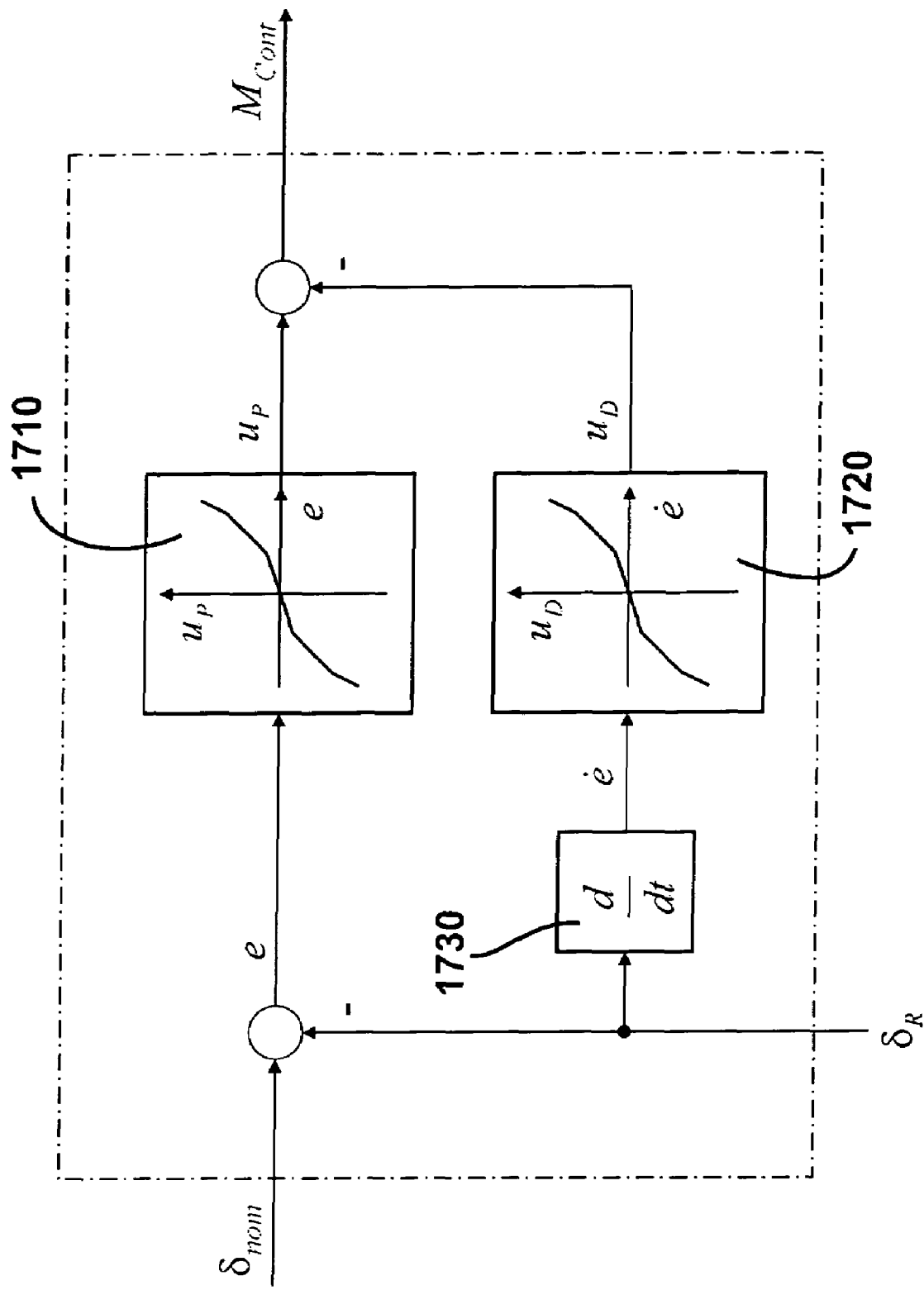
FIG. 17 is an embodiment of a steering angle controller.

The control component $M_{reg}$ of the additional moment $\Delta M$ is determined by the controller 1340. An advantageous embodiment of this controller is illustrated in FIG. 17.

The control component in this embodiment is determined from a difference between an amplified deviation $\delta_{nominal}-\delta_R$ and an amplified steering angle velocity $\dot{\delta}_R$.

The amplifications are determined by way of characteristic curves $u_p(\delta_{nominal}-\delta_R)$ and $u_D(\dot{\delta}_R)$ in blocks 1710 and 1720. The steering angle velocity $\dot{\delta}_R$ is defined by means of a differentiating circuit 1730, which is realized by an appropriate real differentiator. Preferably, the differentiating circuit 1730 is a $DT_1$-element.

Figure 18:
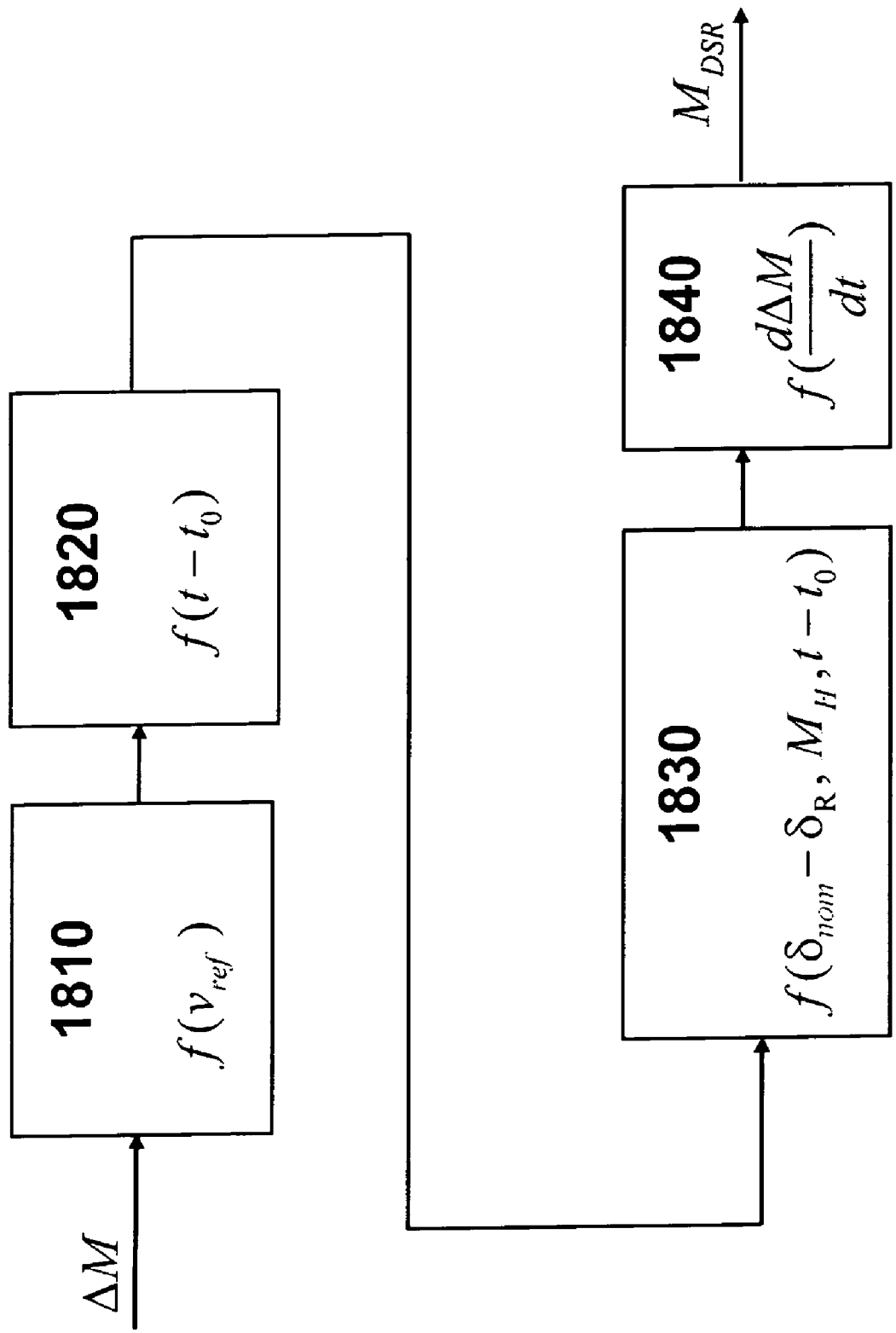
FIG. 18 is a development of a block of the block diagram illustrated in FIG. 13 for limiting the additional steering torque.

In addition, a limitation of the additional steering torque $\Delta M$ is performed depending on the instantaneous driving condition and the instantaneous driver behavior. A block diagram of a limitation component is shown in FIG. 18.

A speed-responsive limitation is carried out in block 1810, and a greater limitation of the additional steering torque takes place in a lower speed range than in a medium speed range. It has shown that many operators consider a like speed-responsive limitation as especially comfortable. The additional steering torque is significantly limited in high-speed ranges because interventions due to errors in the behavior of the operator of the vehicle can cause major damage in this range. The limitation within block 1810 is preferably carried out by way of a characteristic curve which is e.g. defined in driving tests.

Block 1820 diminishes the additional steering torque with an increasing duration of the control intervention. It is hereby prevented that control interventions are erroneously performed due to an increasing rate of errors in defining the input variables such as brake pressures, or due to an increasing number of incorrect ratings, e.g. in estimating the course steering angle in a braking operation while cornering. Usually the operator of the vehicle, when alerted to the hazard situation after a defined duration of the intervention and instructed to stabilize the vehicle, will be able to fully take over the task of steering control.

Further, a limitation is provided which takes the behavior of the vehicle operator into account. In block 1830, it is established from the measured hand steering torque $M_H$ applied by the operator and from the instantaneous deviation of the steering angle, whether the operator follows the instructions of the control system, or whether he opposes them. In this arrangement, a temporally progressive consideration and evaluation of these variables allows forming a variable that is an indicator of the opposition of the driver. If this variable exceeds a predetermined threshold value, the additional steering torque will be reduced until the value 0 in block 1830.

Further, dynamics limitation is performed in block 1840, at which the rise or fall of the additional steering torque is limited in order to prevent quick application of the additional steering torque to the steering wheel. Without this limitation, it would be possible with a very high dynamics of the EPS servo motor that a sudden introduction of the additional steering torque hits the steering wheel out of the operator's hands.

The output signal of the limitation component is the steering torque requirement $M_{DSR}$ to the ESP servo motor. In an understeering situation, the steering torque $M_{DSR}$ supports the driver in avoiding abrupt steering angle changes so that skidding of the vehicle is prevented when a change to a high coefficient of friction takes place.

The invention claimed is:

1. A method for assisting an operator of a vehicle in stabilizing the vehicle, wherein the vehicle includes a steering line and wherein an additional steering torque is applied to the steering line of the vehicle, the method comprising the steps of detecting an unstable driving condition, determining a value of a reference yaw rate based on a vehicle model by way of a value of at least one variable predefined by the operator, determining an instantaneous value of a yaw rate, determining an instantaneous steering angle, determining a nominal steering angle, determining a first component of the additional steering torque depending on a steering angle difference between the instantaneous steering angle at steerable wheels of the vehicle and the nominal steering angle, wherein the steering angle difference depends on the difference between the instantaneous value of the yaw rate of the vehicle and the value of the reference yaw rate, applying the additional steering torque to the steering line, and withdrawing the additional steering torque when the absolute value of the instantaneous yaw rate drops below the value of the reference yaw rate determined at the start of the instable driving condition.

2. The method as claimed in claim 1,
wherein the value of the reference yaw rate is established depending on a steering angle set by the operator of a vehicle.

3. The method as claimed in claim 1,
wherein the steering angle deviation is determined depending on a difference between the instantaneous yaw rate of the vehicle and the value of the reference yaw rate which.

4. The method as claimed in claim 1,
wherein the point of time of a start of an unstable driving situation is determined by an activation logic.

5. The method as claimed in claim 4,
wherein the activation logic has access to results of a driving situation detection unit in order to detect the start of an unstable driving situation.

6. The method as claimed in claim 1,
comprising the step of determining a second component of the additional steering torque depending on an estimated value of a tire resetting moment.

7. The method as claimed in claim 6,
wherein the tire resetting moment is estimated by a disturbance observer unit.

8. The method as claimed in claim 6,
wherein the additional steering torque is established by addition of the first and the second component.

9. The method as claimed in claim 1,
wherein the amount of the additional steering torque is limited.

* * * * *